US012741471B2

(12) United States Patent
Richard

(10) Patent No.: US 12,741,471 B2
(45) Date of Patent: Sep. 22, 2026

(54) METHOD FOR ALIGNING PRINTING HEADS OF A PRINTING DEVICE AND PRINTING DEVICE

(71) Applicant: BOBST MEX SA, Mex (CH)

(72) Inventor: Matthieu Richard, Remoray (FR)

(73) Assignee: BOBST MEX SA, Mex (CH)

( * ) Notice: Subject to any disclaimer, the term of this patent is extended or adjusted under 35 U.S.C. 154(b) by 276 days.

(21) Appl. No.: 18/338,724

(22) Filed: Jun. 21, 2023

(65) Prior Publication Data

US 2023/0415491 A1 Dec. 28, 2023

(30) Foreign Application Priority Data

Jun. 22, 2022 (EP) .................................... 22180507

(51) Int. Cl.

| | |
|---|---|
| ***B41J 2/21*** | (2006.01) |
| ***B41J 25/00*** | (2006.01) |
| *B41J 2/045* | (2006.01) |

(52) U.S. Cl.

CPC ........... *B41J 2/2146* (2013.01); *B41J 2/2135* (2013.01); *B41J 25/003* (2013.01); *B41J 2/04505* (2013.01); *B41J 2/2139* (2013.01); *B41J 2/2142* (2013.01)

(58) Field of Classification Search

CPC ...... B41J 2/2146; B41J 2/2135; B41J 25/003; B41J 2/04505; B41J 2/2139; B41J 2/2142; B41J 2202/20; B41J 25/001; B41J 2/04501; B41J 2/04508; B41J 3/445

See application file for complete search history.

(56) References Cited

U.S. PATENT DOCUMENTS

| | | | | |
|---|---|---|---|---|
| 6,106,094 | A * | 8/2000 | Otani | ..................... B41J 29/393 347/19 |
| 6,464,331 | B1 | 10/2002 | Van Doorn et al. | |
| 2003/0090534 | A1 | 5/2003 | Valero et al. | |
| 2005/0083364 | A1 | 4/2005 | Billow | |
| 2009/0028613 | A1 | 1/2009 | Plasswich et al. | |

(Continued)

FOREIGN PATENT DOCUMENTS

| | | | | |
|---|---|---|---|---|
| CN | 101267948 | A * | 9/2008 | ......... H04N 1/00087 |
| CN | 102712194 | A | 10/2012 | |

(Continued)

*Primary Examiner* — Justin Seo

(74) *Attorney, Agent, or Firm* — Bookoff McAndrews, PLLC

(57) ABSTRACT

A method for aligning printing heads (12) of a printing device is provided, the printing heads (12) being two-dimensional printing heads (12) comprising a plurality of nozzles (30). In one method step, an ink drop is dispensed at a plurality of nozzles (30) of every printing head (12) simultaneously to print an image, preferably at all nozzles (30) of every printing head (12). In another step, the printed image is captured by a camera (20) whose resolution may be smaller than the print resolution. The position and/or orientation of each of the printing heads (12) is determined based on the image captured by the camera (20) and the deviation of the position and/or orientation of each printing head (12) from a target position and/or orientation is determined. The position and/or the orientation of the printing heads (12) is adjusted based on the determined deviation. Moreover, a printing device (10) is provided.

18 Claims, 3 Drawing Sheets

(56) References Cited

U.S. PATENT DOCUMENTS

Figure 1:
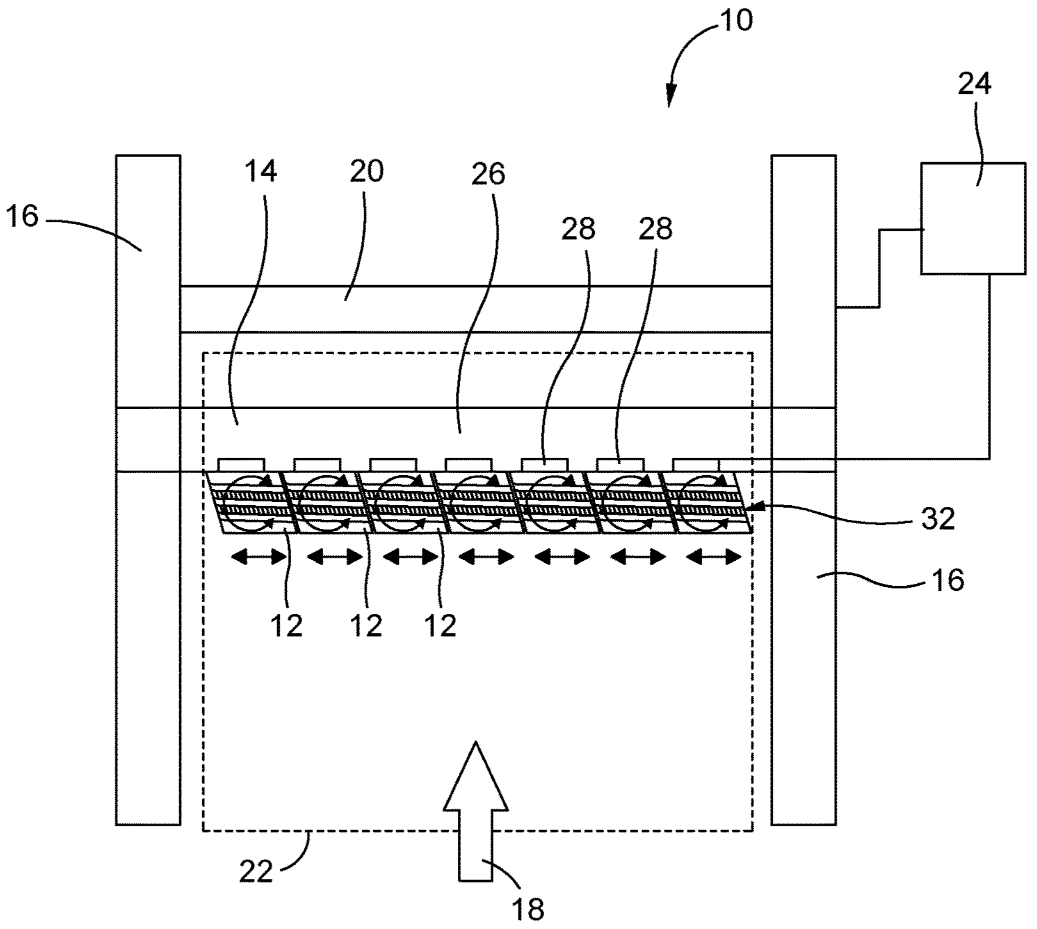

| | | | | |
|---|---|---|---|---|
| 2009/0267977 | A1 | 10/2009 | Sumi | |
| 2012/0249673 | A1* | 10/2012 | Mita | B41J 2/16552 347/33 |
| 2016/0279982 | A1 | 9/2016 | Rai | |
| 2017/0057262 | A1 | 3/2017 | Takada et al. | |
| 2017/0217156 | A1 | 8/2017 | Puig Vilàet al. | |
| 2019/0077143 | A1* | 3/2019 | Krieger | B41J 2/2139 |
| 2020/0001617 | A1 | 1/2020 | Kencana et al. | |
| 2023/0415492 | A1* | 12/2023 | Richard | B41J 2/155 |

FOREIGN PATENT DOCUMENTS

| | | | |
|---|---|---|---|
| CN | 106004040 | A | 10/2016 |
| CN | 106881965 | A | 6/2017 |
| CN | 114536975 | A | 5/2022 |
| CN | 117261436 | A | 12/2023 |
| JP | 2006341231 | A | 12/2006 |
| WO | 2007039444 | A1 | 4/2007 |

* cited by examiner

METHOD FOR ALIGNING PRINTING HEADS OF A PRINTING DEVICE AND PRINTING DEVICE

CROSS-REFERENCE TO RELATED APPLICATION(S)

This patent application claims the benefit of priority to European Application No. 22180507.0, filed on Jun. 22, 2022, the entirety of which is incorporated herein by reference.

The present invention refers to a method for aligning printing heads of a printing device and a printing device comprising at least two printing heads.

Printing devices have several printing heads which are aligned along the width of the printing device. The alignment of the printing heads usually occurs in an automated manner. For example, an image printed by a printing head is captured and depending on the position of the image, it is estimated whether the printing head is properly aligned or not.

The alignment has to be very accurate in order to ensure high printing quality.

However, the known methods are not satisfactory regarding the required precision.

It is thus an object of the invention to provide an improved method for aligning printing heads of a printing device as well as a respective printing device.

This object is solved by a method for aligning printing heads of a printing device, the printing heads being two-dimensional printing heads comprising a plurality of nozzles. Each printing head has nozzles arranged in columns and rows, wherein each column and row has at least two nozzles (the columns and rows don't need to be perpendicular). The printing heads are two-dimensional as opposed to one-dimensional printing heads where the nozzles are aligned on a single row. In one step of the method, ink drops are dispensed at a plurality of nozzles of every printing head simultaneously to print an image on a substrate, preferably at all nozzles of every printing head. The printed image is captured by a camera, wherein the pixel size of the camera is preferably less than half of the distance between two adjacent nozzles measured along a row of nozzles. The position and/or orientation of each of the printing heads is determined based on the image captured by the camera and the deviation of the position and/or orientation of each printing head from a target position and/or orientation is determined and the position and/or the orientation of the printing heads is adjusted based on the determined deviation.

Let's defined the horizontal direction as the direction transverse to the advance direction of the printing device, and the vertical direction as the direction parallel to the advance direction of the printing device. When referring to the width, we refer to a length measured along the horizontal direction.

The pixel size of the camera is defined as the width of the camera's field of view measured on the substrate divided by the number of pixels along a line of the captured image by assuming, for the sake of the definition, that the line of the captured image is aligned with the horizontal direction. For example, if the field of view measured on the substrate is 10 cm wide, i.e., the image captures a ten cm wide area of the substrate, and the image captured by the camera is 1000 pixels wide, the pixel size is 10/1000 cm.

By dispensing ink drops at a plurality of nozzles simultaneously, the geometric pattern of the chosen nozzles is reproduced on the paper/support. Thus, by measuring the position of each ink drop individually, and by assuming that the relative position of each ink drop corresponds to the relative position of the chosen nozzles on the printing head, we can compute the (global) position of the printing head. Conversely, by assuming a target position of the printing head, we can compute a target position for each ink drop.

The inventive method facilitates the adjustment of the printing heads in a simple and precise manner. By means of the camera having a pixel size of less than half of the distance of two adjacent nozzles, it is ensured that the camera may capture and distinguish every dot printed by the printing head. Thereby, the position and/or orientation of each of the printing heads is determined in a very accurate manner, which allows an equally accurate adjustment of the position and/or orientation of the printing heads. By means of the inventive method, the adjustment can occur accurately enough such that no transition zone is visible on the print between the printing head and its neighbouring printing head.

For example, the image printed by the printing head as means of aligning the printing heads consists of a plurality of dots, wherein each dot corresponds to one of the nozzles of the printing head, i.e. each nozzle prints one dot.

Instead of printing a dot at every nozzle, it is also possible that only a predetermined group of nozzles is addressed for the alignment process.

The camera in particular captures the dots printed by the printing head separately. That means that the camera, due to the inventive pixel size, can distinguish all the dots printed by a printing head.

A further advantage is that a camera having the inventive pixel size produces less data than a camera whose pixel size would exceed the print resolution, reducing the overall cost and processing time.

The pixel size in the sense of the application means the size of an area of the printed image that is projected on an individual pixel of a camera sensor. Usually, the inventive pixel has a squared shape in the printed image.

The camera for example has an optic which is configured such that a respective square of the image is projected on a pixel of the camera sensor.

For example, the camera has a sensor with pixels in the size of 5 μm. By means of a suitable optic, a square of for example 90 μm width is projected on a pixel of the camera.

The method may comprise several iterations in order to ensure that each printing head is aligned with the best possible accuracy.

For aligning the printing heads it is made use of the fact that the position of the nozzles within a printing head is known with a high precision.

According to one aspect, the position of the printing heads is adjusted mechanically in a direction transverse to an advance direction of the printing device. The advance direction corresponds to a printed substrate travel direction. The adjustment thus occurs in a simple manner.

Preferably, the rotational position of the printing heads is also adjusted mechanically.

A delay parameter may be determined for at least one printing head in order to compensate a misalignment of the printing head along an advance direction of the printing device. Thereby, an adjustment in an advance direction of the printing device is achieved by control means in a non-mechanical manner and the position of the printing head in advance direction can be rigidly fixed, in particular, such that the printing head is immovable in advance direction. In other words, a mechanical adjustment in the advance direction can be omitted.

According to one embodiment, the camera captures the pattern of dots printed by a printing head and the captured pattern is compared to a pattern of the nozzles of the printing head. Since the position of the nozzles is known with high accuracy, a deviation of the dot positions can be detected.

For example, the dispensation of an ink drop from a nozzle is modified in terms of timing with respect to the dispense of ink drops from the other nozzles of the printing head for the subsequent printing process if a deviation has been detected between the pattern of dots printed by a printing head and the nozzle pattern. In other words, the dispense of ink drops at single nozzles may be controlled with a delay value in order to compensate variations in the dispense timing or variation in the ink drop velocity resulting in an incorrect position of the drop on paper of different nozzles of a printing head.

The camera preferably covers the whole width of the printing heads. Thereby, the camera can capture the images printed by all printing heads of a row of printing heads. This also contributes to a precise alignment of the printing heads. A camera that covers the whole width of the printing heads does not need to run back and forth to capture all images printed by the printing heads (the camera might be the result of concatenating several cameras side-by-side in an offline assembly and calibration process if the field of view of a single camera is too narrow to cover the complete paper width). Thus, the measurement accuracy is particularly high and the position of the printing heads with respect to each other can be determined in a precise manner. Also, the time to process the alignment is shortened compared to a moving camera, since every image captured by the camera records information about the alignment of every printing head simultaneously.

The object of the invention is further solved by a printing device, in particular an ink jet printing device, comprising at least two printing heads, the printing heads being two-dimensional printing heads comprising a plurality of nozzles, wherein each printing head has nozzles arranged in columns and rows, wherein each column and row has at least two nozzles (30), and wherein the position and/or orientation of the printing heads is adjustable, a camera being configured to capture an image printed by the printing heads, a control unit configured to process the image captured by the camera and to determine a deviation of the position and/or orientation of the printing heads from a target position, and an adjustment unit configured to adjust a position and/or orientation of the printing heads based on a deviation determined by the control unit.

Preferably, the pixel size of the camera is less than half of the distance between two adjacent nozzles of a printing head By adjacent nozzles we mean two nozzles having the minimal distance between them along the columns or along the rows of the printing head.

As already explained with respect to the inventive method, the pixel size of the camera of less than half of the distance between two adjacent nozzles ensuring that the camera may capture and distinguish every dot printed by the printing head such that the adjustment of the printing heads is facilitated in a simple and precise manner. Please note that the distance between two adjacent nozzles is much larger than the distance between two adjacent printed pixels in a printed image, thanks to the print head geometry. By distance between two adjacent pixels we mean the horizontal distance between two columns of an image printed at the highest print resolution. We will refer to this distance as the print resolution distance.

For example, the pixel size of the camera is 0.4 times the distance between two adjacent nozzles of a printing head or less. When the pixel size is at least slightly less than half of the distance of two adjacent nozzles, the camera is able to distinguish the dots printed by a printing head even if the position of the dots deviates from an ideal position. This may happen, for example, if single drops out of the nozzles of the printing head are delayed while the paper travels along the advance direction.

The printing device is configured for carrying out the method described above.

The pixel size of the camera may be bigger than a required measurement accuracy. For example, a typical requirement is an accuracy of 50 μm. Thus, the pixel size may be bigger than 50 μm. This is made possible by the multiplicity of measurement points which give the printing head position measurement a higher accuracy than the individual measurement accuracy of each printed dot. In other words, we can afford to have a pixel size larger than 50 μm for a positioning accuracy specification of (less than) 50 μm.

Preferably, the pixel size of the camera is larger than half print resolution distance. For example, when considering a print resolution of 1200 dpi, half the (maximum) printable resolution is of the order of 10 μm, thus the pixel size of the camera can be larger than 10 μm. In other words, we can afford using a pixel size larger than 10 μm even if we have a print resolution of 1200 dpi. According to the sampling theory, to be able to distinguish every pixel of a printed image, we should sample with a distance smaller than half the print resolution. But this would render the system expensive and the amount of data to be processed would be huge, thus limiting the maximal speed at which the system can operate. Also, having a pixel size of 10 μm would complexify the capture of the complete paper width. Having a pixel size smaller than 10 μm would allow us to measure the printed pixels directly using a brute force method, without having necessarily to print an image of the printing head by dispensing the ink drops at a plurality of nozzles simultaneously. Please remember that the distance between two adjacent nozzles is much larger than the print resolution distance, thanks to the print head geometry. Thus, we can afford to use a camera with a pixel size which is larger than half the print resolution distance. In practice, we can use a camera pixel size which is larger than the print resolution distance, even larger than twice, three times, or even four to five times the print resolution distance.

Preferably, the camera has a double function and also works as a quality control camera for controlling the quality of a printed image in normal production operation. This is particularly advantageous regarding the compact and cost-efficient construction of the printing device.

The control unit may be configured to control a timing of a dispensation of ink drops from every nozzle of a printing head individually. In other words, an individual delay may be achieved for the dispensation of ink drops from every single nozzle of a printing head. This allows fine adjustment of the printing pattern within one printing head. Thereby, a particularly high printing quality is achieved by reducing the error between the expected and the real printing dot position for every printed dot.

According to one aspect, the control unit is configured to control a timing of a dispensation of ink drops from the different printing heads. In other words, a global delay may be achieved for the dispensation of ink drops from all nozzles of a printing head, i.e. the dispensation of ink drops is delayed with the same value at every nozzle of one printing head.

The delay depends on a printing speed, in particular the paper travel speed, for the individual delay as well as for the global delay.

For example, the position of the printing heads is adjustable in a direction transverse to an advance direction of the printing device and the position of the printing heads is rigidly fixed with respect to the advance direction. This simplifies the setup of the printing device and makes the position of the printing head more stable.

To enable a rotational adjustment of the printing heads, the printing heads may be mounted rotatably. A rotational adjustability, in particular in combination with an adjustability in a direction transverse to an advance direction of the printing device, allows a very flexible positioning of the printing heads.

Each printing head has nozzles arranged in columns and rows, wherein each column and row has at least two nozzles. In particular, each column and row comprises a plurality of nozzles. Thereby, a particularly high resolution of an image printed by the printing device is achieved.

For example, the columns and rows are arranged in the form of a parallelogram. The nozzles are displaced with respect to each other such that the dots printed by one printing head can be positioned closer to each other than a distance between the nozzles, which contributes to a high resolution of the printed image.

In particular, the distance between two adjacent nozzles of the printing head is significantly larger than the distance with which two adjacent printed dots can be printed on paper, i.e. significantly larger than the print resolution distance. This is made possible by the two-dimensional aspect of the printing head, which can, for example, produce a single line of dots on paper by adjusting the timing of the dispense of ink drops accordingly.

Preferably, the camera is a line camera covering the whole width of the printing heads. Thus, the camera does not need to travel back and forth on a rail to perform the calibration of the printing heads, which contributes to high accuracy.

The camera is preferably positioned downstream of the printing heads with respect to the paper travel direction.

The printing heads are for example attached to a bar extending transverse to an advance direction of the printing device. This enables a stable suspension of the printing heads.

For example, the bar is attached to a machine frame.

Figure 2:
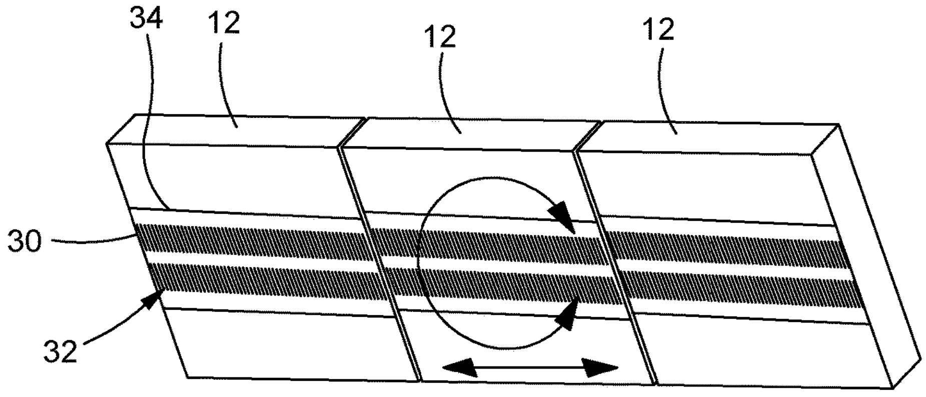
Figure 3:
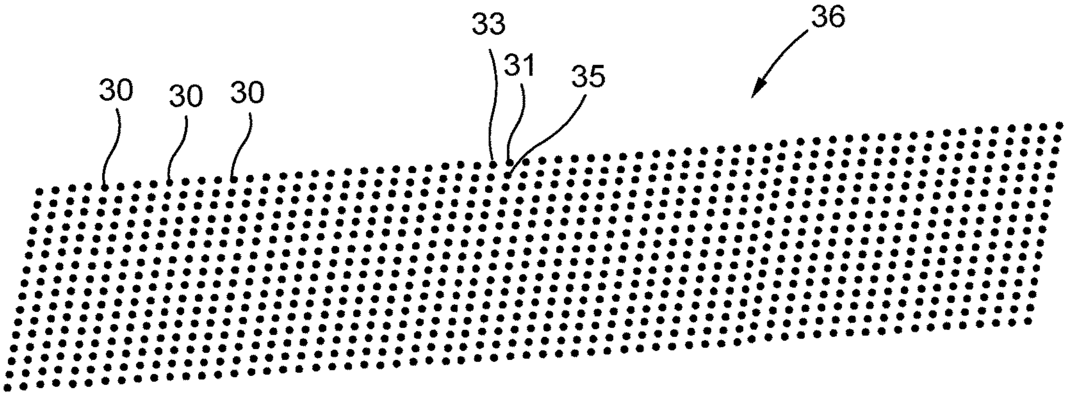
Figure 4:
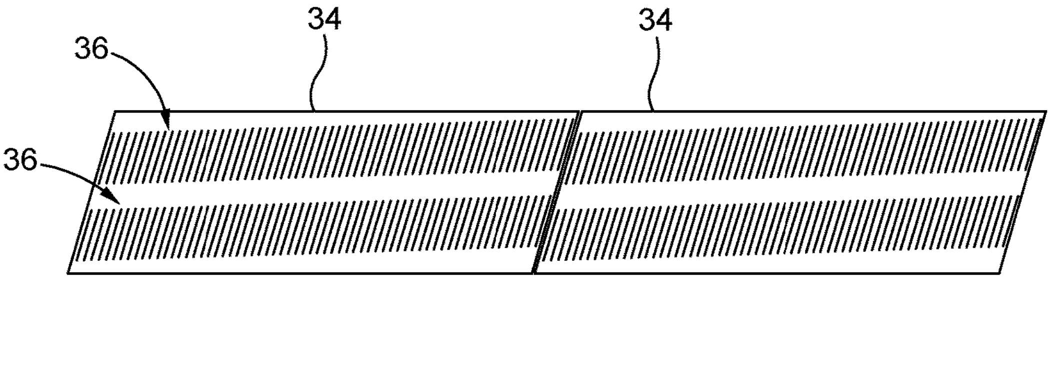
Figure 5:
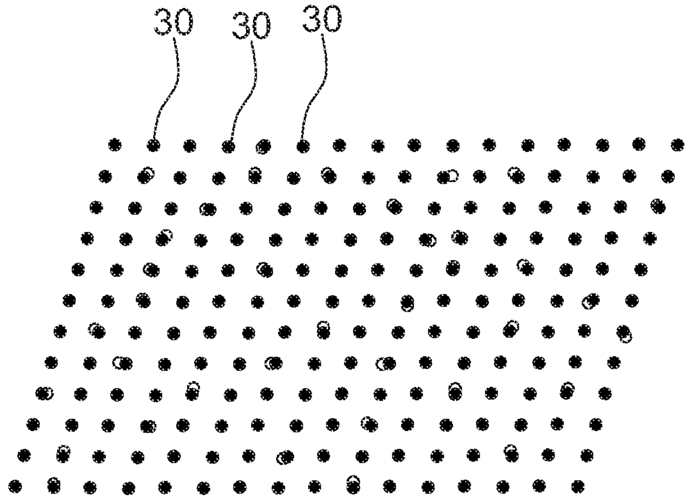

Further features and advantages of the invention become apparent from the following description and the enclosed figures. In the figures:

FIG. 1 shows an inventive printing device in a schematic view seen from below, FIG. 2 shows printing heads of the inventive printing device of FIG. 1, FIG. 3 shows a representation of a nozzle pattern of one of the printing heads of FIG. 2 seen from inside the printing head, FIG. 4 schematically shows panels of two printing heads seen from inside the printing head, and FIG. 5 shows a pattern visualizing the dots printed by a printing head compared to a nozzle pattern.

FIG. 1 shows a printing device 10 comprising a plurality of printing heads 12 in a schematic view. In the depicted embodiment, seven printing heads 12 are shown, however, the number of printing heads 12 may vary.

The printing device 10 is an ink jet printing device, in particular a digital printer.

The printing device 10 has a resolution of that corresponds to a 20 μm distance between printed dot or an even better resolution. The resolution is given by the number of printable dots per unit length.

The printing heads 12 are attached to a bar 14 extending transverse to an advance direction of the printing device 10.

The bar 14 is attached to a machine frame 16 of the printing device 10.

The advance direction corresponds to a paper/substrate travel direction and is indicated in FIG. 1 by arrow 18.

All the printing heads 12 attached to one bar 14 are configured to print a single colour. Thus, for printing different colours the printing device 10 comprises several printing bars 14 with attached printing heads 12 that are arranged along the advance direction. For reasons of simplicity, only one printing bar 14 is depicted in FIG. 1.

The printing device comprises a camera 20, which is for example a 2D-camera, in particular a line camera, that is configured to capture an image printed by the printing heads 12.

The camera 20 covers the whole width of the printing heads 12. In particular, the camera 20 extends over the whole width of a paper 22 that is processed in the printing device 10.

The camera is positioned downstream of the printing heads 12 with respect to the paper travel direction 18.

The printing device 10 further comprises a control unit 24 configured for processing the image captured by the camera 20.

The control unit 24 is further configured for determining a deviation of the position and/or orientation of the printing heads 12 from a target position.

The target position is a position in which the printing heads 12 attached to one bar 14 are aligned with respect to each other in such a way that an image printed by the printing device 10 is printed with the required accuracy i.e. such that no transition zone between two printing heads 12 is visible on the printed image.

In order to align the printing heads 12 with respect to each other, the printing device comprises an alignment unit 26.

The alignment unit 26 is configured to adjust a position and/or orientation of the printing heads 12 based on a deviation determined by the control unit 24.

The position of the printing heads 12 is adjustable in a direction transverse to the advance direction 18 of the printing device 10, in particular by means of the alignment unit 26.

Furthermore, the printing heads 12 are mounted rotatably.

The position of the printing heads 12 with respect to the advance direction 18 is rigidly fixed.

For example, the alignment unit 26 comprises alignment means 28 assigned to each printing head 12.

The alignment means 28 may comprise a linear drive and/or a rotational drive in order to adjust the position and/or orientation of the printing heads 12.

The printing heads 12 are two-dimensional printing heads.

FIG. 2 shows three printing heads 12 arranged in a row in a view from below such that the nozzles 30 of the printing heads 12 are visible.

Each of the printing heads 12 comprises a plurality of nozzles 30 (see also FIGS. 3 and 4).

More precisely, each printing head 12 comprises a printing section 32 in which the nozzles 30 are arranged.

Each nozzle 30 can be addressed individually.

Also, the amount of ink ejected from a nozzle 30 can be controlled individually.

The nozzles 30 are produced in a panel 34 which is inserted in the printing head 12.

In order to print an image, drops of ink are dispensed from the nozzles 30 in order to form dots on a paper/substrate 22 while the paper/substrate 22 travels along the advance direction, i.e., the vertical direction.

The control unit 24 is configured to control the timing when a drop is dispensed from a nozzle 30. In particular, the control unit 24 is configured to delay a dispensation of ink drops from a nozzle.

According to one aspect, a global delay can be achieved by means of the control unit 24. That means that the control unit 24 adapts the timing for dispensation of ink from all nozzles 30 of a printing head 12 in a similar manner.

According to another aspect an individual delay can be achieved, which means that the timing for dispensation of ink from the nozzles is controlled individually for every single nozzle 30 of a printing head 12.

FIG. 3 shows a nozzle pattern 36 of a printing head 12. The pattern 36 depicted in FIG. 3 may be present twice on each printing head 12, as it is apparent in FIG. 2.

The position of the nozzles 30 in the printing head 12 can be manufactured with a high accuracy, in particular with an accuracy in the submicron range. For example, the position of the nozzles 30 is produced with an accuracy of 80 to 100 nm.

The nozzles 30 are arranged in columns and rows, wherein each column and row has a plurality of nozzles 30.

More precisely, the columns and rows are arranged in form of a parallelogram.

The specific pattern of the nozzles 30 facilitates a high resolution of an image printed by the printing device.

In one exemplary embodiment, the printer can print a dot every 21.16 μm while a diameter of the dot is 30 μm.

FIG. 4 schematically shows the panels 34 of two printing heads 12 comprising the nozzle pattern 36 of FIG. 3. Adjacent nozzles are aligned along the almost vertical diagonal in FIG. 4.

However, the nozzle pattern 36 of FIG. 3 is comprised twice by each printing head 12, wherein there is a distance between the patterns 36.

The parallelograms formed by the columns and rows of nozzles 30 are tilted and/or skewed with respect to the outer boundaries of the printing heads 12.

More precisely, a row formed by the outermost nozzles 30 of the nozzle pattern 36 is inclined with respect to an edge of the printing head 12 extending in a direction transverse to the advance direction 18. This tilted arrangement ensures a continuous printing dot coverage capability in a direction transverse to an advance direction of the printing device 10 despite a small (adjustable) gap between the printing heads 12. In other words, the leftmost nozzle in a printing head is located to the left of the rightmost nozzle of its (closest) neighbouring printing head when there is no gap between the printing heads, the right and left direction being measured along the direction transverse to an advance direction 18 of the printing device 10. Thanks to the inclination of the outermost nozzles 30 of the nozzle pattern 36, the largest acceptable gap between the printing heads 12 that keeps a continuous printing dot coverage is increased. In particular, due to the tilted arrangement, two neighbouring printing heads 12 can print with a slight overlap to avoid a visible gap in the printed image even if there is a slight distance between the printing heads 12.

The pixel size of the camera 20 is related to the nozzle pattern 36, in particular to a distance of the nozzles 30.

In FIG. 3, nozzle 31 is adjacent to nozzle 33 and to nozzle 35. The distance between adjacent nozzles is the distance between nozzle 31 and nozzle 33 or the distance between nozzle 31 and nozzle 35. In the case that these two distances are not equal, we consider the distance between two adjacent nozzles to be the smallest of said two distances.

In practice, to determine the position of the printing head, we need to distinguish the columns formed by the dots of the printed nozzle pattern 36. Thus, the pixel size of the camera 20 has to be smaller or equal to half the distance between two of said columns.

The pixel size of the camera 20 is less than half of the distance between two adjacent nozzles 30 of a printing head 12, for example 0.4 times the distance between two adjacent nozzles 30. Thus, the camera 20 comprises at least two pixels for one dot printed by a printing head 12.

Yet, the pixel size of the camera 20 is bigger than a required measurement accuracy, in particular bigger than 50 μm.

In an exemplary embodiment, the pixel size is 90 μm.

FIG. 5 shows a printing pattern printed by a printing head 12 compared to a nozzle pattern 36.

The filled dots visualize the position of the nozzles 30. The unfilled dots visualize the position of the dots printed by the printing head 12.

In an ideal scenario, when every ink drop lands exactly at the desired position on the paper 22, the arrangement of the printed dots corresponds to the nozzle pattern 36.

In FIG. 5, however, it is obvious that the arrangement of the dots does not completely correspond to the nozzle pattern 36. This deviation is due to different random factors, like for example, small differences in reaction time of each individual nozzle, small differences in ejection pressure and speed or differences in the angle of ejection of the ink drops. Also, to make the dots visible, one might generate several drops of ink in a very fast pace instead of a single one, making the dots slightly elongated.

Such a deviation can be compensated along the advance direction 18 of the printing device 10 by means of the control unit 24 controlling the timing of a dispensation of ink drops from every nozzle of a printing head individually.

The compensation becomes effective for images printed after the compensation happened.

In the following, a method for aligning the printing heads 12 of a printing device 10 is described.

An alignment of the printing heads 12 is necessary before the first use of the printing device 10 or after a printing head 12 has been exchanged or reinstalled, for example after maintenance. Only when all printing heads 12 are properly aligned, a high-quality print can be achieved.

Firstly, the printing device 10 is started and a paper/substrate 22 travels along the advance direction 18.

While the paper 22 travels along the advance direction 18, an ink drop is dispensed at a plurality of nozzles 30 of every printing head 12 simultaneously to print an image, preferably at all nozzles 30 of every printing head 12.

However, it is also possible that ink is dispensed only at a determined group of nozzles 30. For example, ink may be dispensed from every nozzle 30 except the outermost nozzles 30 of the nozzle pattern 36. In another example, the ink may be dispensed from every third (or n-th) nozzle 30 of the nozzle pattern 36 (in both directions).

By dispensing an ink drop from each nozzle 30 simultaneously, the printed dots allow conclusions about the positions of the printing heads 12 with respect to each other. The simultaneous dispensation is only necessary for a calibration process, in the regular operation of the printing device, a simultaneous dispense is not required.

While the paper 22 travels further along the advance direction 18, the printed image is captured by a camera 20.

Because of the specific pixel size already discussed above, the camera 20 can distinguish all the dots printed by the printing heads 12.

For each dot of the image that is captured by the camera 20, it is estimated by the control unit 24 from which nozzle 30 the ink producing the dot has most likely been ejected.

Based on the image captured by the camera 20, the position and/or orientation of each of the printing heads 12 is determined.

The position and/or orientation of the printing head 12 is for example estimated by means of bundle adjustment. For example, an iteratively reweighted square method can be used.

Optionally, a scale parameter could be added in the estimation.

Afterwards, the deviation of the position and/or orientation of each printing head 12 from a target position and/or orientation is determined, in particular by means of the control unit 24.

For example, information about a target position of the printing heads 12 is saved in a memory of the control unit 24.

The control unit 24 does not only determine a misalignment of printing heads 12 of one printing bar 14, but also between printing heads 12 of different bars 14.

If a deviation has been detected, the position and/or the orientation of the printing heads 12 is adjusted, in particular by means of the adjustment unit 26.

When a deviation has been detected regarding a position of a printing head 12 in a direction traverse to an advance direction 18 of the printing device 10, the position of the printing heads 12 is adjusted mechanically in the respective direction.

If a deviation has been detected regarding a rotational orientation of a printing head 12, the orientation is adjusted mechanically.

The position of the printing heads 12 can be adjusted with an accuracy better than 5 μm.

However, if a deviation has been detected regarding a position of a printing head 12 in the advance direction 18, the misalignment is compensated by means of the control unit 24 determining a delay parameter for the respective printing head 12. In particular, the control unit 24 effects a global delay.

Moreover, in order to compensate for the misalignment of individual dots of an image with respect to the nozzles 30 of the printing head 12, the dispensation of an ink drop from a respective nozzle 30 is modified in terms of timing with respect to the dispense of ink drops from the other nozzles 30 of the printing head 12 for the subsequent printing process.

The dispensation timing of each individual nozzle 30 is controlled by the control unit 24.

The invention claimed is:

1. A method for aligning printing heads of a printing device, the printing heads being two-dimensional printing heads comprising a plurality of nozzles, each printing head has nozzles arranged in columns and rows, wherein each column and row has at least two nozzles, the method comprising:

dispensing an ink drop at each of a plurality of nozzles arranged in the columns and rows of every printing head simultaneously to print a pattern of dots that reproduces a geometric pattern of the nozzles of the printing heads on a substrate, capturing a printed image of the pattern by a camera, determining a position and/or orientation of each of the printing heads based on the pattern of simultaneously dispensed ink drops in the image captured by the camera and determining a deviation of the position and/or orientation of each printing head from a target position and/or orientation, and adjusting the position and/or the orientation of the printing heads based on the determined deviation.

2. The method according to claim 1, wherein a pixel size of the camera is larger than a distance between two neighboring columns of an image printed with a highest print resolution;

the pixel size of the camera being defined as a width of a field of view of the camera measured on the substrate along a direction transverse to an advance direction of the printing device, divided by a number of pixels along the width of the captured image.

3. The method according to claim 1, wherein a pixel size of the camera is less than half a distance between two adjacent nozzles along a row of a printing head of the printing heads.

4. The method according to claim 1, further comprising:

adjusting the position of the printing heads mechanically in a direction traverse to an advance direction of the printing device.

5. The method according to claim 1, further comprising:

determining a delay parameter for at least one printing head of the printing heads in order to compensate a misalignment of the at least one printing head along an advance direction of the printing device.

6. The method according to claim 1, wherein the camera captures the pattern of dots printed by a printing head of the printing heads, and the captured pattern is compared to the geometric pattern of the nozzles of the printing head of the printing heads.

7. The method according to claim 1, further comprising:

modifying the dispensation of an ink drop from a nozzle in terms of timing with respect to the dispense of ink drops from other nozzles of a printing head of the printing heads for a subsequent printing process if a deviation has been detected between a pattern of dots printed by the printing head and the nozzle pattern.

8. The method according to claim 1, wherein the camera covers an entire width of the printing heads.

9. A printing device, in particular an ink jet printing device, comprising:

at least two printing heads, the printing heads being two-dimensional printing heads comprising a plurality of nozzles, wherein a position and/or orientation of the printing heads is adjustable, and wherein each printing head has nozzles arranged in columns and rows, wherein each column and row has at least two nozzles, a camera configured to capture an image printed by the printing heads by simultaneously dispensing an ink drop onto a substrate from each of the nozzles arranged in the columns and rows of each of the at least two printing heads to print a pattern of dots that reproduces a geometric pattern of the nozzles of each of the at least two printing heads, a control unit configured for processing the image captured by the camera and for determining a deviation of the position and/or orientation of the at least two printing heads from a target position based on the simultaneously dispensed ink drops in the image, and an adjustment unit configured to adjust a position and/or orientation of the at least two printing heads based on a deviation determined by the control unit.

10. The printing device according to claim 9, wherein a pixel size of the camera is larger than a distance between two neighboring columns of an image printed with a highest print resolution, in particular larger than 50 μm;

the pixel size of the camera being defined as a width of a field of view of the camera measured on the substrate, along a direction traverse to an advance direction of the printing device, divided by a number of pixels along the width of the captured image.

11. The printing device according to claim 9, wherein a pixel size of the camera is less than half of a distance between two adjacent nozzles along a row of a printing head of the at least two printing heads.

12. The printing device according to claim 9, wherein the control unit is configured to individually control a timing of a dispensation of ink drops from every nozzle of a printing head of the at least two printing heads.

13. The printing device according to claim 9, wherein the control unit is configured to control a timing of a dispensation of ink drops from different printing heads of the at least two printing heads.

14. The printing device according to claim 9, wherein the position of the printing heads is adjustable in a direction transverse to an advance direction of the printing device and the position of the printing heads is rigidly fixed with respect to the advance direction.

15. The printing device according to claim 9, wherein the at least two printing heads are mounted rotatably.

16. The printing device according to claim 9, wherein the columns and rows are arranged in form of a parallelogram.

17. The printing device according to claim 9, wherein the camera is a line camera covering an entire width of the at least two printing heads.

18. The printing device according to claim 9, wherein the at least two printing heads are attached to a bar extending transverse to an advance direction of the printing device.

* * * * *